US012424138B2

(12) United States Patent
Fu et al.

(10) Patent No.: US 12,424,138 B2
(45) Date of Patent: Sep. 23, 2025

(54) DISPLAY DRIVING METHOD AND DISPLAY DEVICE

(71) Applicant: Innolux Corporation, Miaoli County (TW)

(72) Inventors: Syue-Ling Fu, Miaoli County (TW); Yeh-Yi Lan, Miaoli County (TW); Cheng-Cheng Pan, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/631,086

(22) Filed: Apr. 10, 2024

(65) Prior Publication Data

US 2024/0386829 A1 Nov. 21, 2024

(30) Foreign Application Priority Data

May 15, 2023 (CN) ........................ 202310544189.X

(51) Int. Cl.
*G09G 3/20* (2006.01)

(52) U.S. Cl.
CPC ......... *G09G 3/2007* (2013.01); *G09G 3/2092* (2013.01); *G09G 2310/0251* (2013.01); *G09G 2320/0257* (2013.01)

(58) Field of Classification Search
CPC ......... G09G 3/2074; G09G 2320/0285; G09G 2320/0252; G09G 2310/0251; G09G 2310/027; G09G 3/2007; G09G 3/2092
See application file for complete search history.

(56) References Cited

U.S. PATENT DOCUMENTS

| | | | | |
|---|---|---|---|---|
| 2017/0178585 A1* | 6/2017 | Chang | .................. | G09G 3/3648 |
| 2020/0175910 A1* | 6/2020 | Kim | ...................... | G09G 3/2007 |
| 2021/0287620 A1* | 9/2021 | Kim | ...................... | G09G 3/3648 |
| 2021/0312850 A1* | 10/2021 | Kim | ...................... | G09G 3/2003 |
| 2022/0157270 A1* | 5/2022 | Wu | ...................... | G09G 3/3648 |

FOREIGN PATENT DOCUMENTS

| | | |
|---|---|---|
| CN | 105448263 | 3/2016 |
| CN | 115713920 | 2/2023 |
| TW | 200929144 | 7/2009 |
| TW | 200941442 | 10/2009 |

OTHER PUBLICATIONS

"Office Action of Taiwan Counterpart Application", issued on Jul. 29, 2025, p. 1-p. 7.

* cited by examiner

*Primary Examiner* — Xuemei Zheng
(74) *Attorney, Agent, or Firm* — JCIPRNET

(57) ABSTRACT

A display driving method and a display device are provided. The display driving method includes following steps: obtaining frame data of a current frame; driving a first pixel according to a first grayscale value corresponding to the first pixel in the frame data; determining whether a second grayscale value corresponding to a second pixel in the frame data is significantly different from the first grayscale value corresponding to the first pixel; obtaining a new second grayscale value when the second grayscale value is significantly different from the first grayscale value; and driving the second pixel according to the new second grayscale value. The display driving method and display device of the disclosure may achieve good display effects.

16 Claims, 9 Drawing Sheets

510

| Grayscale value | Previous grayscale value | | | | | | | | | |
|---|---|---|---|---|---|---|---|---|---|---|
| Current grayscale value | | 0 | 32 | 64 | 96 | 128 | 160 | 192 | 224 | 255 |
| | 0 | 0 | 0 | 0 | 0 | 3 | 4 | 5 | 6 | 7 |
| | 32 | 32 | 32 | 32 | 32 | 32 | 40 | 45 | 47 | 49 |
| | 64 | 64 | 64 | 64 | 64 | 64 | 64 | 68 | 70 | 72 |
| | 96 | 96 | 96 | 96 | 96 | 96 | 96 | 96 | 99 | 100 |
| | 128 | 115 | 128 | 128 | 128 | 128 | 128 | 128 | 128 | 130 |
| | 160 | 140 | 150 | 160 | 160 | 160 | 160 | 160 | 160 | 160 |
| | 192 | 180 | 185 | 190 | 192 | 192 | 192 | 192 | 192 | 192 |
| | 224 | 190 | 195 | 200 | 210 | 224 | 224 | 224 | 224 | 224 |
| | 255 | 200 | 205 | 210 | 220 | 222 | 255 | 255 | 255 | 255 |

FIG. 5A

520

| Grayscale value | Previous grayscale value | | | | | | | | |
|---|---|---|---|---|---|---|---|---|---|
| Current grayscale value | 0 | 32 | 64 | 96 | 128 | 160 | 192 | 224 | 255 |
| 0 | 0 | 0 | 0 | 0 | 3 | 3 | 5 | 5 | 5 |
| 32 | 32 | 32 | 32 | 32 | 32 | 40 | 45 | 45 | 45 |
| 64 | 64 | 64 | 64 | 64 | 64 | 64 | 68 | 68 | 68 |
| 96 | 96 | 96 | 96 | 96 | 96 | 96 | 96 | 99 | 99 |
| 128 | 115 | 128 | 128 | 128 | 128 | 128 | 128 | 128 | 130 |
| 160 | 140 | 150 | 160 | 160 | 160 | 160 | 160 | 160 | 160 |
| 192 | 180 | 180 | 182 | 192 | 192 | 192 | 192 | 192 | 192 |
| 224 | 210 | 210 | 210 | 220 | 224 | 224 | 224 | 224 | 224 |
| 255 | 200 | 200 | 200 | 220 | 220 | 255 | 255 | 255 | 255 |

FIG. 5B

DISPLAY DRIVING METHOD AND DISPLAY DEVICE

CROSS-REFERENCE TO RELATED APPLICATION

This application claims the priority benefit of China application serial no. 202310544189.X, filed on May 15, 2023. The entirety of the above-mentioned patent application is hereby incorporated by reference herein and made a part of this specification.

BACKGROUND

Technical Field

The disclosure relates to a display technology, and particularly relates to a display driving method and a display device.

Description of Related Art

Generally, under a display mode of high-frequency frame refresh rate of a conventional display panel, insufficient charging of a data voltage often occurs, resulting in line shape image sticking at a boundary of a black display region and a white display region, which causes poor display quality of a display frame.

SUMMARY

The disclosure is directed to a display driving method and a display device, which achieve good display effects.

According to an embodiment of the disclosure, the display driving method includes following steps: obtaining frame data of a current frame; driving a first pixel according to a first grayscale value corresponding to the first pixel in the frame data; determining whether a second grayscale value corresponding to a second pixel in the frame data is significantly different from the first grayscale value corresponding to the first pixel; obtaining a new second grayscale value in response to the second grayscale value being significantly different from the first grayscale value; and driving the second pixel according to the new second grayscale value.

According to an embodiment of the disclosure, the display device includes a timing controller, a display driver and a display panel. The timing controller is coupled to a data signal source and configured to obtain frame data of a current frame. The display driver is coupled to the timing controller. The display panel is coupled to the display driver. The timing controller drives a first pixel through the display driver according to a first grayscale value corresponding to the first pixel in the frame data. The timing controller determines whether a second grayscale value corresponding to a second pixel in the frame data is significantly different from the first grayscale value corresponding to the first pixel. When the timing controller determines that the second grayscale value is significantly different from the first grayscale value, the timing controller obtains a new second grayscale value, and the timing controller drives the second pixel through the display driver according to the new second grayscale value.

Based on the above description, the display driving method and the display device of the disclosure may automatically adjust grayscale values displayed by the pixels of the display panel to achieve a good display effect.

BRIEF DESCRIPTION OF THE DRAWINGS

FIG. 5A is a schematic diagram of a look-up table according to an embodiment of the disclosure.

FIG. 5B is a schematic diagram of a look-up table according to another embodiment of the disclosure.

DESCRIPTION OF THE EMBODIMENTS

Figure 1:
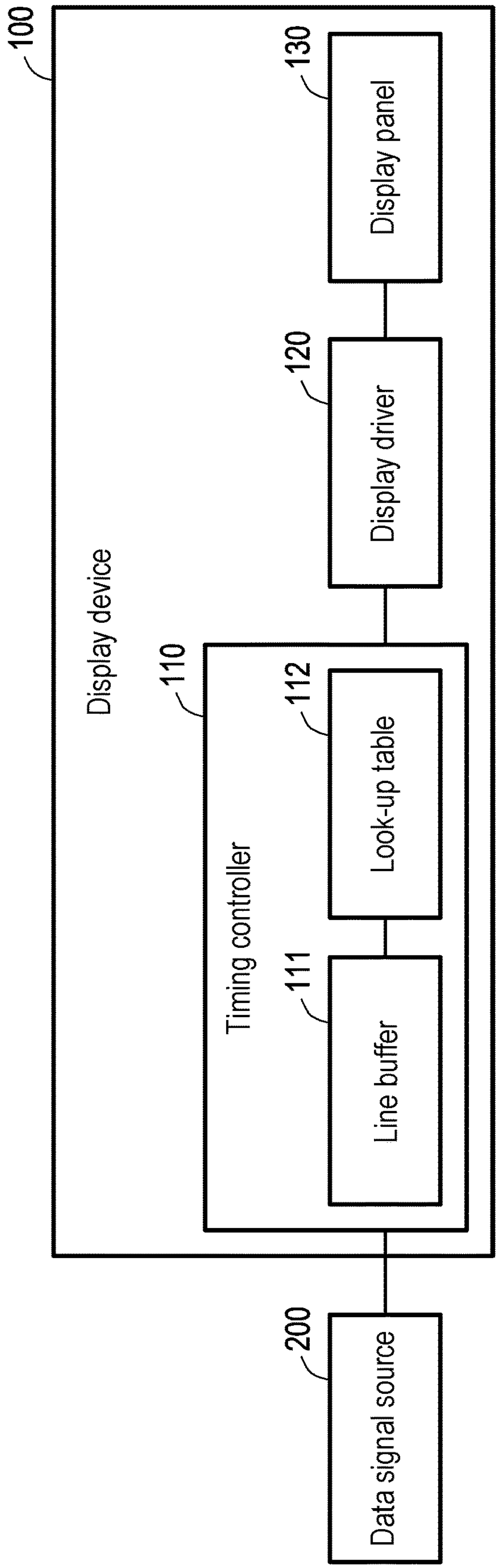
FIG. 1 is a schematic diagram of a display device according to an embodiment of the disclosure.

Reference will now be made in detail to the exemplary embodiments of the disclosure, examples of which are illustrated in the accompanying drawings. Wherever possible, the same reference numbers are used in the drawings and descriptions to refer to the same or like parts. Moreover, without departing from the spirit of the disclosure, features in the following several different embodiments may be replaced, reorganized, and mixed to complete other embodiments.

FIG. 1 is a schematic diagram of a display device according to an embodiment of the disclosure. Referring to FIG. 1, a display device 100 includes a timing controller (TCON) 110, a display driver 120 and a display panel 130. The display driver 120 is coupled to the timing controller 110 and the display panel 130. The timing controller 110 includes a line buffer 111 and a look-up table (LUT) 112. The look-up table 112 may be stored in a memory. The timing controller 110 is coupled to a data signal source 200. In the embodiment, the timing controller 110 may receive display data (including frame data corresponding to a plurality of consecutive frames) from the data signal source 200, and output corresponding driving data to the display driver 120 according to the frame data, and the display driver 120 may provide corresponding data signals to a plurality of pixels in a pixel array of the display panel 130 according to the corresponding driving data.

In the embodiment, the display device 100 may include a virtual reality device, an augmented reality device, a head-up display device, a transparent display device, a sensing device or a splicing device, but the disclosure is not limited thereto. The display device may be a bendable or flexible electronic device. The display device may be a non-self-luminous display device or a self-luminous display device. The sensing device may be a sensing device for sensing capacitance, light, heat or ultrasonic wave, but the disclosure is not limited thereto. The display device 100 may, for example, include passive components and active components, such as capacitors, resistors, inductors, diodes, transistors, etc. The diodes may include light emitting diodes or photodiodes. The light emitting diodes may, for example, include inorganic light emitting diodes, organic light emitting diodes (OLEDs), mini LEDs, micro LEDs or quantum dot LEDs, but the disclosure is not limited thereto. The splicing device may be, for example, a display splicing device, but the disclosure is not limited thereto. It should be noted that the display device 100 may be any permutation and combination of the aforementioned devices, but the disclosure is not limited thereto.

In the embodiment, the display panel 130 may include, for example, liquid crystal and light emitting diodes. The light emitting diodes may, for example, include organic light emitting diodes (OLEDs), mini LEDs, micro LEDs or quantum dot (QD) LEDs (which may be, for example, QLEDs, QDLEDs), fluorescence, phosphor or other suitable materials or any permutation and combination of the aforementioned materials, but the disclosure is not limited thereto.

Figure 2A:
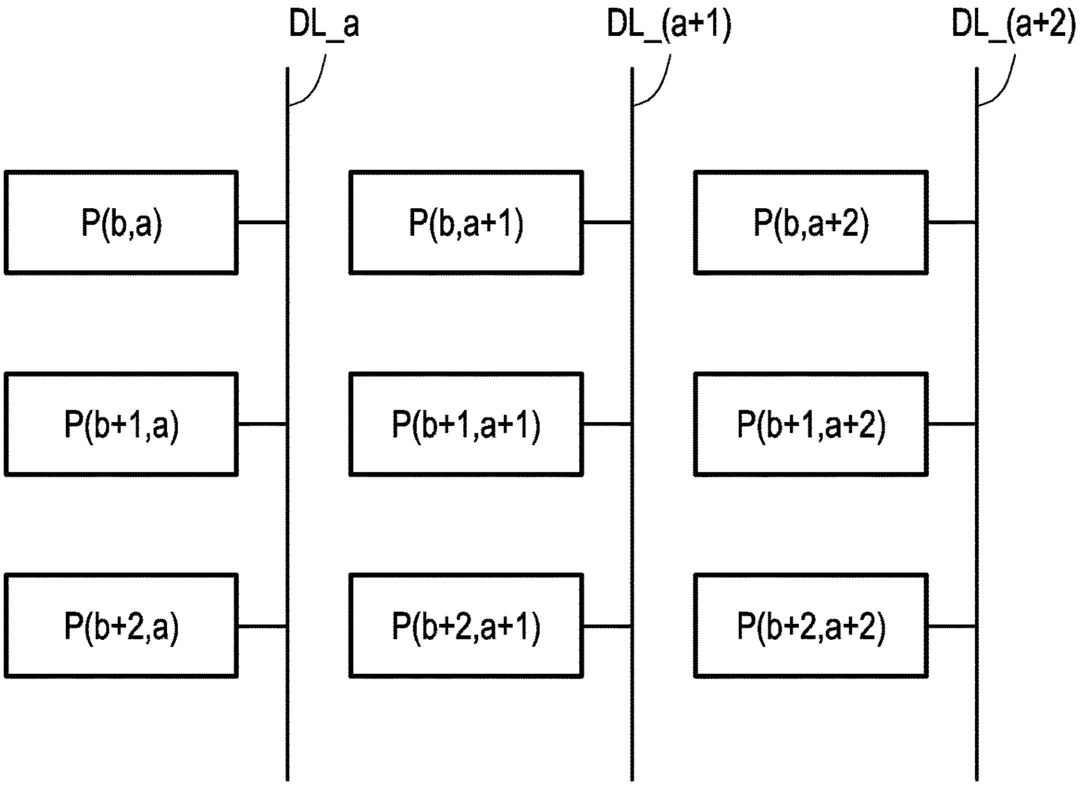
FIG. 2A is a schematic diagram of a pixel array according to an embodiment of the disclosure.

FIG. 2A is a schematic diagram of a pixel array according to an embodiment of the disclosure. The pixel array of the display panel 130 of FIG. 1 may include a plurality of pixels P(n, m), where n and m are positive integers. Referring to FIG. 2A, FIG. 2A is a schematic diagram of a part of the pixel array of the display panel 130. In the embodiment, pixels P(b, a), P(b+1, a) and P(b+2, a) of a same column may be coupled to a same data signal line DL_a. Pixels P(b, a+1), P(b+1, a+1) and P(b+2, a+1) of a same column may be coupled to a same data signal line DL_(a+1). Pixels P(b, a+2), P(b+1, a+2) and P(b+2, a+2) of a same column may be coupled to a same data signal line DL_(a+2). In this regard, a plurality of pixels belonging to a same column may sequentially obtain corresponding data signals (voltage signals) from the same corresponding data signal line in different scan periods. Moreover, the pixels P(b, a), P(b, a+1) and P(b, a+2) of a same row may also be coupled to a same scan signal line. The pixels P(b+1, a), P(b+1, a+1) and P(b+1, a+2) of a same row may also be coupled to a same scan signal line. The pixels P(b+2, a), P(b+2, a+1) and P(b+2, a+2) of a same row may also be coupled to the same scan signal line. In this regard, a plurality of pixels belonging to a same row may be turned on simultaneously during a same scan period according to a scan signal provided by the corresponding same scan signal line. It should be noted that FIG. 2A is only used to illustrate a coupling relationship between the pixels and the data signal lines, and the arrangement of multiple pixels in the pixel array of the display panel of the disclosure is not limited to that shown in FIG. 2A. In an embodiment, a plurality of pixels coupled to a same data signal line may also be arranged in a zig-zag shape. For example, the pixels P(b, a), P(b+1, a+1), and P(b+2, a) coupled to the same data signal line DL_a may be arranged alternately on both sides of the data signal line DL_a. In this regard, the pixel P(b, a) may be arranged on a left side of the data signal line DL_a, the pixel P(b+1, a+1) may be arranged on a right side of the data signal line DL_a, and the pixel P(b+2, a) may be arranged on the left side of the data signal line DL_a. In addition, configuration of the pixels P(b, a+1), P(b+1, a+2) and P(b+2, a+1) coupled to the same data signal line DL_(a+1) and the pixels P(b, a+2), P(b+1, a+3) (not shown) and P(b+2, a+2) coupled to the same data signal line DL_(a+2) may also be deduced by analogy.

Figure 2B:
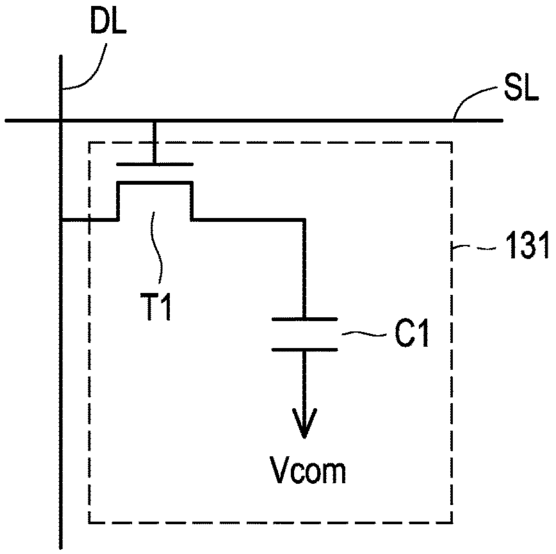
FIG. 2B is a schematic diagram of a pixel according to an embodiment of the disclosure.

FIG. 2B is a schematic diagram of a pixel according to an embodiment of the disclosure. Referring to FIG. 1 and FIG. 2B, a part of circuit structure of each pixel in the pixel array of the display panel 130 of FIG. 1 may be implemented as a pixel 131 in FIG. 2B. In the embodiment, the pixel 131 includes a scan transistor T1 and a pixel capacitor C1. The scan transistor T1 may be an N-type transistor. A control terminal of the scan transistor T1 is coupled to a scan signal line SL. A first terminal of the scan transistor T1 is coupled to a data signal line DL. A second terminal of the scan transistor T1 is coupled to a first terminal of the pixel capacitor C1. A second terminal of the pixel capacitor C1 is coupled to a reference voltage Vcom (for example, a reference voltage for deflecting liquid crystal molecules). The pixel capacitor C1 may be an equivalent capacitance, and may be an equivalent result corresponding to a plurality of capacitances in the pixel 131 (for example, a liquid crystal capacitance, a storage capacitance, a parasitic capacitance and/or a stray capacitance).

Figure 3:
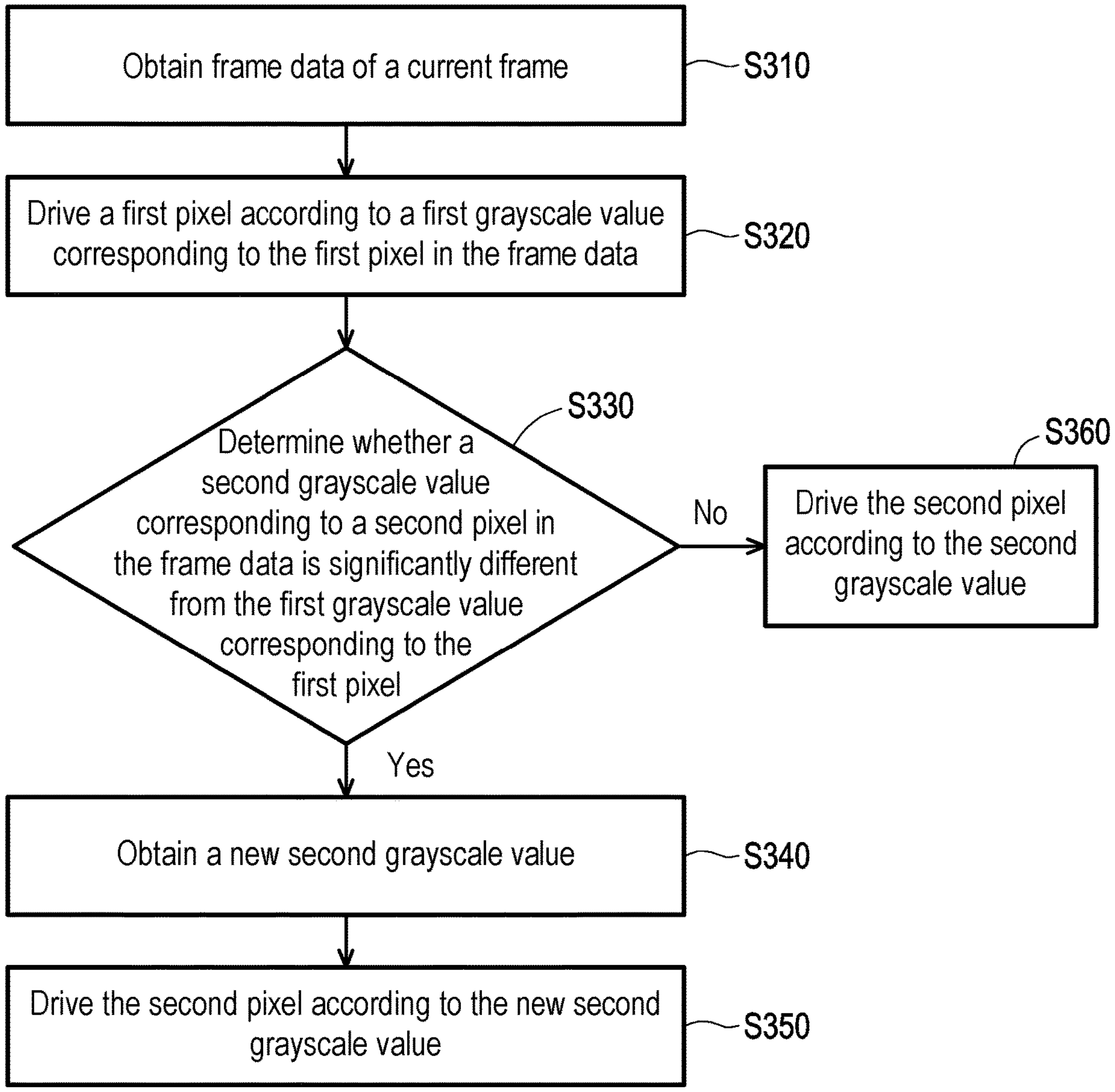
FIG. 3 is a flowchart of a display driving method according to an embodiment of the disclosure.

FIG. 3 is a flowchart of a display driving method according to an embodiment of the disclosure. Referring to FIG. 1, FIG. 2A and FIG. 3, the display device 100 may perform following steps S310-S360, and the pixels P(b, a), P(b+1, a) and P(b+2, a) belonging to the same column in FIG. 2A are used as a reference for description. The pixels P(b, a), P(b+1, a) and P(b+2, a) are coupled to the same data signal line DL_a. In step S310, the timing controller 110 may obtain frame data of a current frame from the data signal source 200. In step S320, the timing controller 110 may drive a first pixel (for example, the pixel P(b, a)) according to a first grayscale value (or brightness value or pixel value) corresponding to the first pixel (for example, the pixel P(b, a)) in the frame data. In step S330, the line buffer 111 of the timing controller 110 may determine whether the second grayscale value corresponding to a second pixel (for example, the pixel P(b+1, a)) in the frame data is significantly different from the first grayscale value corresponding to the first pixel (for example, the pixel P(b, a)). The first pixel (for example, the pixel P(b, a)) is adjacent to the second pixel (for example, the pixel P(b+1, a)). If yes, in step S340, the line buffer 111 may search the look-up table 112 based on the first grayscale value and the second grayscale value to obtain a new second grayscale value. In the embodiment, the new second grayscale value may be between the first grayscale value and the second grayscale value. However, in an embodiment, the new second grayscale value may also be generated by the timing controller 110 executing a specific equation calculation, or by randomly selecting any value between the first grayscale value and the second grayscale value. In step S350, the timing controller 110 may drive the second pixel (for example, the pixel P(b+1, a)) according to the new second grayscale value. If there is no significant difference between the second grayscale value and the first grayscale value, then in step S360, the timing controller 110 may drive the second pixel (for example, the pixel P(b+1, a)) according to the (original) second grayscale value.

Figure 4:
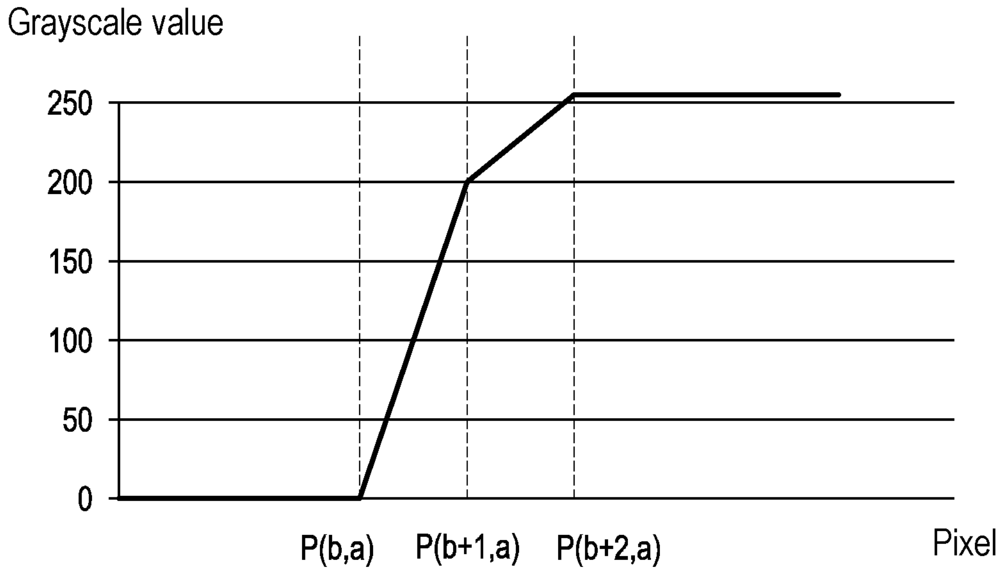
FIG. 4 is a schematic diagram of a plurality of grayscale values of a plurality of pixels according to an embodiment of the disclosure.

In the embodiment, the above-mentioned significant difference may mean that the timing controller 110 determines that the second grayscale value is significantly different from the first grayscale value in response to the second grayscale value being 255 and the first grayscale value being 0. For example, referring to FIG. 4, FIG. 4 is a schematic diagram of a plurality of grayscale values of a plurality of pixels according to an embodiment of the disclosure. During a first scan period in a frame, the timing controller 110 may drive the pixel P(b, a) to display black according to the data signal (data voltage) corresponding to the grayscale value of 0. Then, during a second scan period in the same frame, it is assumed that the grayscale value corresponding to the data signal used to drive the pixel P(b+1, a) is 255 (i.e., it is originally intended to display white), the timing controller 110 may obtain a new grayscale value, such as 200, by performing the above steps S310-S350. Therefore, the timing controller 110 may drive the pixel P(b+1, a) to display gray according to the data signal (data voltage) corresponding to the grayscale value of 200. Then, during a third scan period in the same frame, the timing controller 110 may drive the pixel P(b+2, a) to display white according to the data signal (data voltage) corresponding to the grayscale value of 255. Deduced by analogy, the pixels P(b, a+1), P(b+1, a+1) and P(b+2, a+1) coupled to the same data signal line DL_(a+1) and the pixels P(b, a+2), P(b+1, a+2) and P(b+2, a+2) coupled to the same data signal line DL_(a+2) may also be driven according to the above method.

It is further explained that, in an embodiment, the display device 100 may, for example, operate in a high frame refresh rate mode. In the high frame refresh rate mode, a charging time or discharging time of continuously providing a driving voltage corresponding to the lowest grayscale value (i.e., the grayscale value 0) and a driving voltage corresponding to the highest grayscale value (i.e., the grayscale value 255) by the timing controller 110 through the data signal line DL_a is probably longer than a data refresh period of the data signal line DL_a, but the disclosure is not limited thereto. In other words, in the example of FIG. 4, an original display effect is that the pixels P(b, a)–P(b+2, a) respectively display black, white, and white. In the case of original display, since the data voltage provided by the data signal line DL_a to the pixel P(b+1, a) must be charged from the data voltage provided to the previous pixel P(b, a), the data voltage provided by the data signal line DL_a to the pixel P(b+1, a) may be probably undercharged (for example, the data signal line DL and/or the pixel capacitor C1 in FIG. 2B are undercharged), resulting in the above-mentioned high frame refresh rate mode and especially in the case of displaying a still image for a long time, line shape image sticking may probably occur at a black-and-white boundaries displayed on the display panel 130. In this regard, the timing controller 110 of the disclosure may obtain a new grayscale value of 200 based on the above steps S310-S350, so as to drive the pixel P(b+1, a) through the data voltage corresponding to the new grayscale value of 200. Therefore, the display effect actually displayed by the display panel 130 will be changed to the pixels P(b, a)–P(b+2, a) respectively displaying black, gray and white. From another point of view, during a process that the timing controller 110 provides the data voltage to the pixel P(b+1, a), the data signal line DL_a may be first charged to the data voltage corresponding to the new gray scale value 200. Then, in the process of driving the pixel P(b+1, a), the data signal line DL_a may be further charged to a data voltage corresponding to the grayscale value of 255. In this way, the occurrence of line shape image sticking on the display panel 130 may be effectively alleviated, so as to achieve a good display effect.

Moreover, in an embodiment, the above-mentioned significant difference may also refer to (or include) that the timing controller 110 determines that the second grayscale value is significantly different from the first grayscale value in response to the second grayscale value being 0 and the first grayscale value being 255. In other words, the timing controller 110 of the disclosure may also effectively avoid insufficient discharge of the data voltage provided by the data signal line DL_a to the pixel P(b+1, a) (for example, the data signal line DL and/or pixel capacitor C1 in FIG. 2B are insufficiently discharged), which results in occurrence of the line shape image sticking at the black-and-white boundaries displayed on the display panel 130 in the above-mentioned high frame refresh rate mode, especially in the case of displaying a still image for a long time.

In addition, in another embodiment, the above-mentioned significant difference may also refer to (or include) that the timing controller 110 determines that the second grayscale value is significantly different from the first grayscale value in response to whether a difference between the second grayscale value and the first grayscale value is greater than a threshold. The threshold may be, for example, 100 or 150, which is not limited by the disclosure. The threshold may be determined according to the degree of shift (Vcom shift) caused by the reference voltage Vcom relative to different charging times as shown in FIG. 2B (i.e., the shift of the reference voltage Vcom is lower than a grayscale threshold corresponding to the standard). In this regard, more specifically, when the display device 100 operates in the high frame refresh rate mode, the refresh rate is higher than a speed at which the data signal line provides the data signal (voltage signal) to a plurality of pixels, which may probably cause insufficient discharge of the pixel capacitor C1 in the process of discharging from a high data voltage to a low data voltage. Alternatively, it may cause insufficient charging of the pixel capacitor C1 during the process of charging from the low data voltage to the high data voltage. Due to insufficient charging or discharging of the pixel capacitor C1, the reference voltage Vcom may have a shift phenomenon. In this way, when the display device 100, for example, displays a checkerboard image for a long time, a plurality of pixels at the black-and-white boundaries will be subjected to insufficient discharging or insufficient charging for a long time, resulting in increased reference voltage Vcom shift, so that the checkerboard image displayed by the display device 100 may have the line shape image sticking at the black-and-white boundaries. A shift degree may be, for example, higher than or equal to 0.08 millivolt (mV) or 0.1 mV, but the disclosure is not limited thereto.

Referring to FIG. 1, FIG. 2A and FIG. 5A, FIG. 5A is a schematic diagram of a look-up table according to an embodiment of the disclosure. Taking the threshold of 100 as an example, the timing controller 110 may compare a grayscale value of a previous pixel with a grayscale value of a current pixel, and obtain a new grayscale value for the current pixel through a look-up table 510 of FIG. 5A. The look-up table 510 in FIG. 5A is only for illustration, and an actual look-up table may also have a mapping relationship between the previous grayscale values 0-225 and the current grayscale values 0-255. Or, mapping relationships of other grayscale values may also be generated by interpolation. The pixel P(b, a) and the pixel P(b+1, a) of FIG. 2A are taken as an example in following description. It is assumed that the pixel P(b, a) displays a grayscale value of 0, if the grayscale value (such as 0, 32, 64, 96) corresponding to the original data signal of the pixel P(b+1, a) is equal to 0 or less than or is equal to 100 (i.e., the difference between the previous grayscale value and the current grayscale value is less than or equal to 100), the timing controller 110 drives the pixel P(b+1, a) through the original data signal to display the original grayscale value. Comparatively, it is assumed that the pixel P(b, a) displays the grayscale value of 0, if the grayscale value (for example, 128, 160, 192, 224, 255) corresponding to the original data signal of the pixel P(b+1, a) is greater than 100, the timing controller 110 obtains the data signal corresponding to the new grayscale value through the look-up table 510 to drive the pixel P(b+1, a), so as to display the new grayscale value. Moreover, deduced by analogy, along with gradual increase of the previous grayscale value, the corresponding new grayscale value also increases. For example, the previous grayscale value is 0, 32, 64, 96 or 128, and when the current grayscale value is 255, the new grayscale value may be 200, 205, 210, 220 or 222 (an increasing trend), but the disclosure is not limited thereto.

It is assumed that the pixel P(b, a) displays a grayscale value of 255, if the grayscale value (such as 160, 192, 224, 255) corresponding to the original data signal of the pixel P(b+1, a) is equal to 255 or greater than or equal to 155 (i.e., the difference between the previous grayscale value and the current grayscale value is less than or equal to 100), the timing controller 110 drives the pixel P(b+1, a) through the original data signal, so as to display the original grayscale value. Comparatively, it is assumed that the pixel P(b, a) displays the grayscale value of 0, if the grayscale value (for example, 0, 32, 64, 96, 128) corresponding to the original data signal of the pixel P(b+1, a) is less than 155, the timing controller 110 obtains the data signal corresponding to the new grayscale value through the look-up table 510 to drive the pixel P(b+1, a), so as to display the new grayscale value. Moreover, deduced by analogy, as gradual decrease of the previous grayscale value, the corresponding new grayscale value also decreases. For example, when the previous grayscale value is 255, 224, 192, 160 or 96, and when the current grayscale value is 0, the new grayscale value may be 7, 6, 5, 4 or 3 (a decreasing trend), but the disclosure is not limited thereto.

Referring to FIG. 1, FIG. 2A and FIG. 5B, FIG. 5B is a schematic diagram of a look-up table according to another embodiment of the disclosure. Different from the embodiment of FIG. 5A, as the previous grayscale value increases, the corresponding new grayscale values may also be partly or completely the same. For example, the previous grayscale value is 0, 32, 64, 96 or 128, and when the current grayscale value is 255, the new grayscale value may be 200, 200, 200, 220 or 220 (partially the same). Moreover, as the previous grayscale value decreases, the corresponding new grayscale values may also be partly or completely the same. For example, the previous grayscale value is 255, 224, 192, 160 or 96, and when the grayscale value of the current stroke is 0, the new grayscale value may be 5, 5, 5, 3 or 3 (partially the same), but the disclosure is not limited thereto. In an embodiment, since the shorter the charging time is (or the faster the refresh rate is), the more serious the voltage shift of the reference voltage Vcom of the pixel with the higher grayscale value is, and the pixels changed from low to high grayscale values are more likely to have the line shape image sticking phenomenon, in an embodiment, the timing controller 110 may also perform table look-up only for the pixels changed from low to high grayscale values, or perform table look-up only for only the pixels changed from the grayscale value 0 to 255.

Figure 6A:
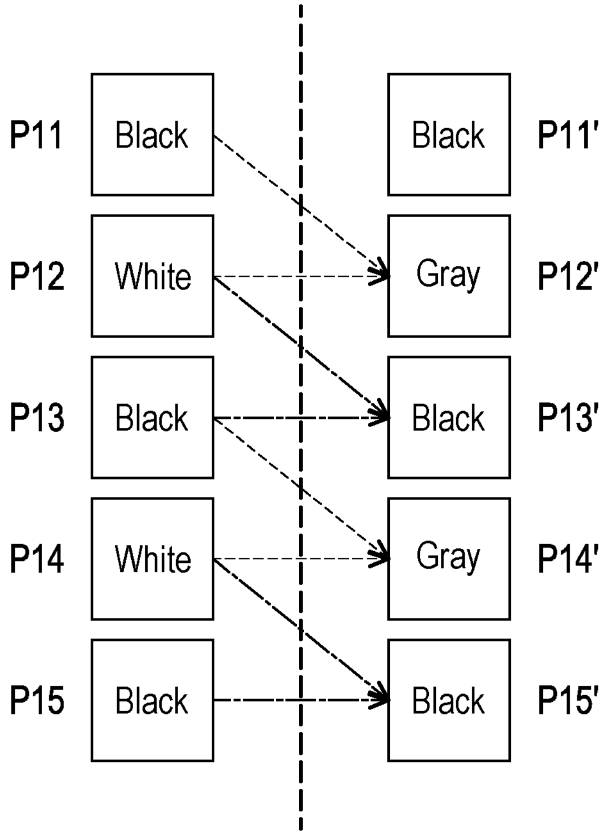
FIG. 6A is a schematic diagram of grayscale changes according to an embodiment of the disclosure.

FIG. 6A is a schematic diagram of grayscale changes according to an embodiment of the disclosure. Referring to FIG. 1 and FIG. 6A, for another example, taking the difference means that the timing controller 110 determines the grayscale value of the current pixel to be significantly different to the grayscale value of the previous pixel in response to the grayscale value of the current pixel being 255 and the grayscale value of the previous pixel being 0 as a premise. In a same frame, original display results P11-P15 corresponding to multiple consecutive pixels coupled to a same data signal line may be, for example, black (grayscale value 0), white (grayscale value 255), black (grayscale value 0), white (grayscale value 255), and black (grayscale value 0). In this regard, the timing controller 110 may adjust an actual display result of the display panel 130 based on the display driving method of the above-mentioned embodiment in FIG. 3. In detail, if the grayscale value of the previous pixel is 0 (original display results P11 and P13), and the original grayscale value of the current pixel is 255 (original display results P12 and P14), the new grayscale value of the current pixel may be reset to a certain value between 0-255 (new display results P12' and P14'). In this way, the actual display results P11'-P15' may be black (grayscale value 0), gray (grayscale value between 0-255), black (grayscale value 0), gray (grayscale value between 0-255) and black (grayscale value 0).

Figure 6B:
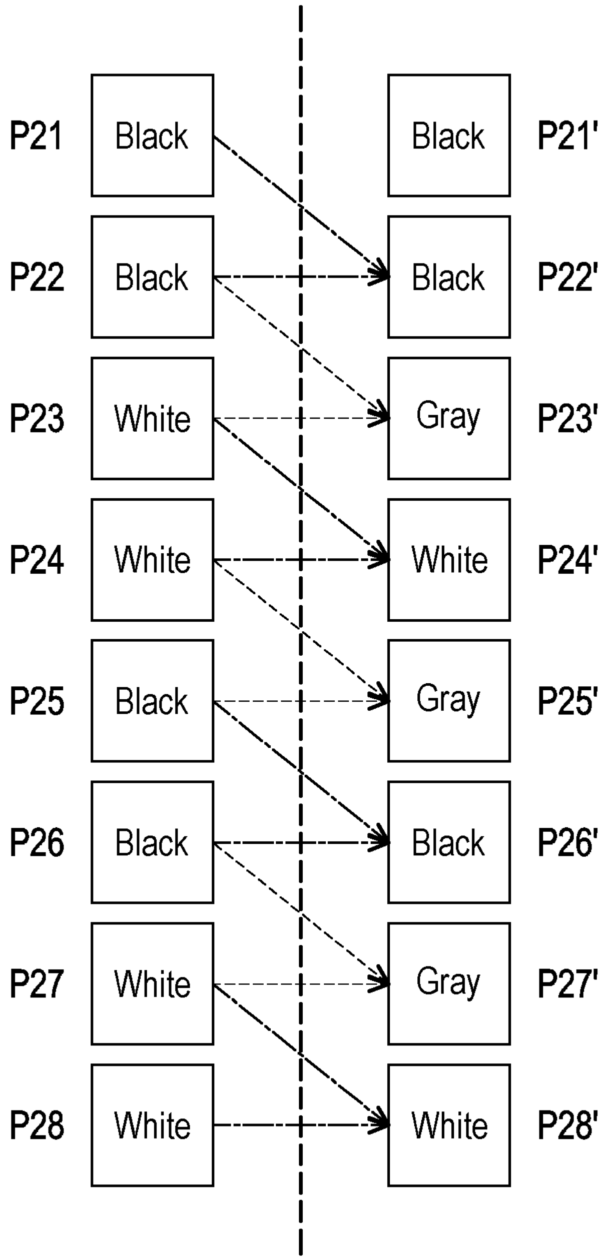
FIG. 6B is a schematic diagram of grayscale changes according to another embodiment of the disclosure.

FIG. 6B is a schematic diagram of grayscale changes according to another embodiment of the disclosure. Referring to FIG. 1 and FIG. 6B, for another example, taking the difference means that the timing controller 110 determines the grayscale value of the current pixel to be significantly different to the grayscale value of the previous pixel in response to the grayscale value of the current pixel being 0 (black) and the grayscale value of the previous pixel being 255 (white), and determines the grayscale value of the current pixel to be significantly different to the grayscale value of the previous pixel in response to the grayscale value of the current pixel being 255 (white) and the grayscale value of the previous pixel being 0 (black) as a premise. In a same frame, original display results P21-P28 corresponding to multiple consecutive pixels coupled to a same data signal line may be, for example, black (grayscale value 0), black (grayscale value 0), white (grayscale value 255), white (grayscale value 255), black (grayscale value 0), black (grayscale value 0), white (grayscale value 255), white (grayscale value 255), black (grayscale value 0) and black (grayscale value 0). In this regard, the timing controller 110 may adjust an actual display result of the display panel 130 based on the display driving method of the above-mentioned embodiment in FIG. 3. In detail, if the grayscale value of the previous pixel is 0 (original display results P22 and P26), and the original grayscale value of the current pixel is 255 (original display results P23 and P27), the new grayscale value of the current pixel may be reset to a certain value between 0-255 (new display results P23' and P27'). Moreover, if the grayscale value of the previous pixel is 255 (original display result P24), and the original grayscale value of the current pixel is 0 (original display result P25), the new grayscale value of the current pixel may be reset to a certain value between 0-255 (new display result P25'). In this way, the actual display results P21'-P28' may be black (grayscale value 255), black (grayscale value 255), gray (grayscale value between 0-255), white (grayscale value 0), gray (grayscale value between 0-255), black (grayscale value 244), gray (grayscale value between 0-255) and white (grayscale value 0).

Figure 7:
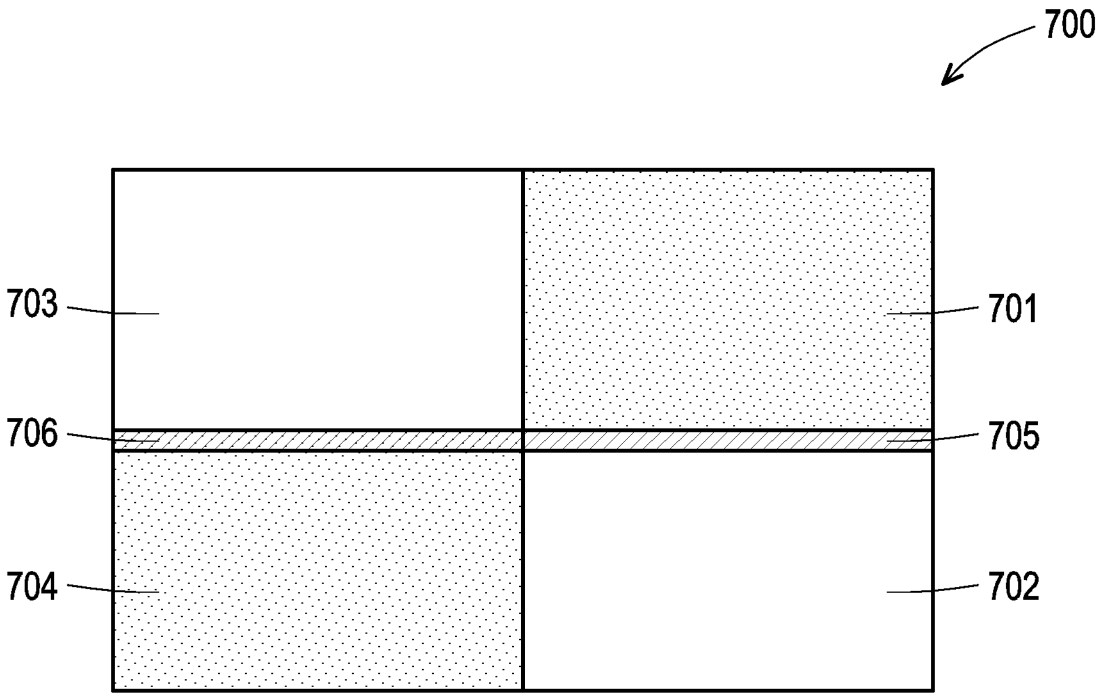
FIG. 7 is a schematic diagram of a display effect of an embodiment of the disclosure.

FIG. 7 is a schematic diagram of a display effect of an embodiment of the disclosure. Referring to FIG. 1 and FIG. 7, based on the display driving method of the embodiments of FIG. 3 and FIG. 6B as described above. The display panel 130 may display a display frame 700 as shown in FIG. 7. The display frame 700 may include black regions 701, 704 and white regions 702, 703, and on the premise that the data signal line extends along a vertical direction (i.e., extend along the black region 701 toward the white region 702), at a boundary of the black region 701 and the white region 702, a display result of a gray region 705 may be displayed (i.e., for example, the grayscale values (original grayscale value of 255) of multiple pixels in a same row in a horizontal direction are reset), and/or at a boundary of the white region 703 and the black region 704, a display result of a gray region 706 may be displayed (i.e., for example, the grayscale values (original grayscale value of 0) of multiple pixels in the same row in the horizontal direction are reset). From another point of view, when the display frame displayed by a certain display device is the display result that the gray regions 705 and 706 shown in FIG. 7 appear at the boundary of the black region and the white region, it means that this display device may be realized by the display driving method of the above-mentioned embodiments of the disclosure. Alternatively, even when the display frame displayed by a certain display device is the display result that only the gray region 705 shown in FIG. 7 appears at the boundary of the black region and the white region, it may still represent that this display device may be realized by the display driving method of the above-mentioned embodiments of the disclosure.

In summary, the display device and display driving method of the disclosure may automatically compare the grayscale value corresponding to the current pixel and the grayscale value corresponding to the next pixel in the frame data, and automatically adjust the grayscale value of the next pixel, so as to pre-charge the data signal lines to effectively reduce the occurrence of line shape image sticking on the display frame, and achieve good display quality of the display frame.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A display driving method, comprising:

obtaining frame data of a current frame;

driving a first pixel according to a first grayscale value corresponding to the first pixel in the frame data;

determining whether a second grayscale value corresponding to a second pixel in the frame data is significantly different from the first grayscale value corresponding to the first pixel;

obtaining a new second grayscale value in response to the second grayscale value being significantly different from the first grayscale value; and driving the second pixel according to the new second grayscale value, wherein the first pixel is coupled to a first scan signal line and a first data signal line, the second pixel is coupled to a second scan signal line and the first data signal line, and the first scan signal line and the second scan signal line are adjacent to each other, wherein a charging time of continuously providing a first driving voltage corresponding to a lowest grayscale value and a second driving voltage corresponding to a highest grayscale value through the first data signal line is greater than a data refresh period of the first data signal line.

2. The display driving method according to claim 1, wherein obtaining the new second grayscale value comprises:

searching a look-up table based on the first grayscale value and the second grayscale value to obtain the new second grayscale value.

3. The display driving method according to claim 1, wherein a discharging time of continuously providing the second driving voltage corresponding to the highest grayscale value and the first driving voltage corresponding to the lowest grayscale value through the first data signal line is greater than the data refresh period of the first data signal line.

4. The display driving method according to claim 1, wherein the first pixel is adjacent to the second pixel.

5. The display driving method according to claim 1, wherein determining whether the second grayscale value is significantly different from the first grayscale value comprises:

determining that the second grayscale value is significantly different from the first grayscale value in response to that a difference between the second grayscale value and the first grayscale value is greater than a threshold.

6. The display driving method according to claim 1, wherein determining whether the second grayscale value is significantly different from the first grayscale value comprises:

determining that the second grayscale value is significantly different from the first grayscale value in response to that the second grayscale value is 255 and the first grayscale value is 0.

7. The display driving method according to claim 1, wherein the step of determining whether the second grayscale value is significantly different from the first grayscale value comprises:

determining that the second grayscale value is significantly different from the first grayscale value in response to that the second grayscale value is 0 and the first grayscale value is 255.

8. The display driving method according to claim 1, wherein the new second grayscale value is between the first grayscale value and the second grayscale value.

9. A display device, comprising:

a timing controller, coupled to a data signal source and configured to obtain frame data of a current frame;

a display driver, coupled to the timing controller; and a display panel, coupled to the display driver, wherein the timing controller drives a first pixel through the display driver according to a first grayscale value corresponding to the first pixel in the frame data, and the timing controller determines whether a second grayscale value corresponding to a second pixel in the frame data is significantly different from the first grayscale value corresponding to the first pixel, wherein in response to the timing controller determines that the second grayscale value being significantly different from the first grayscale value, the timing controller obtains a new second grayscale value, and the timing controller drives the second pixel through the display driver according to the new second grayscale value, wherein the first pixel is coupled to a first scan signal line and a first data signal line, the second pixel is coupled to a second scan signal line and the first data signal line, and the first scan signal line and the second scan signal line are adjacent to each other, wherein a charging time of continuously providing a first driving voltage corresponding to a lowest gray scale value and a second driving voltage corresponding to a highest gray scale value through the first data signal line by the timing controller is greater than a data refresh period of the first data signal line.

10. The display device according to claim 9, wherein the timing controller searches a look-up table based on the first grayscale value and the second grayscale value to obtain the new second grayscale value.

11. The display device according to claim 9, wherein a discharging time of continuously providing the second driving voltage corresponding to the highest grayscale value and the first driving voltage corresponding to the lowest grayscale value through the first data signal line by the timing controller is greater than the data refresh period of the first data signal line.

12. The display device according to claim 9, wherein the first pixel is adjacent to the second pixel.

13. The display device according to claim 9, wherein the timing controller determines that the second grayscale value is significantly different from the first grayscale value in response to that a difference between the second grayscale value and the first grayscale value is greater than a threshold.

14. The display device according to claim 9, wherein the timing controller determines that the second grayscale value is significantly different from the first grayscale value in response to that the second grayscale value is 255 and the first grayscale value is 0.

15. The display device according to claim 9, wherein the timing controller determines that the second grayscale value is significantly different from the first grayscale value in response to that the second grayscale value is 0 and the first grayscale value is 255.

16. The display device according to claim 9, wherein the new second grayscale value is between the first grayscale value and the second grayscale value.

* * * * *